UNITED STATES PATENT OFFICE.

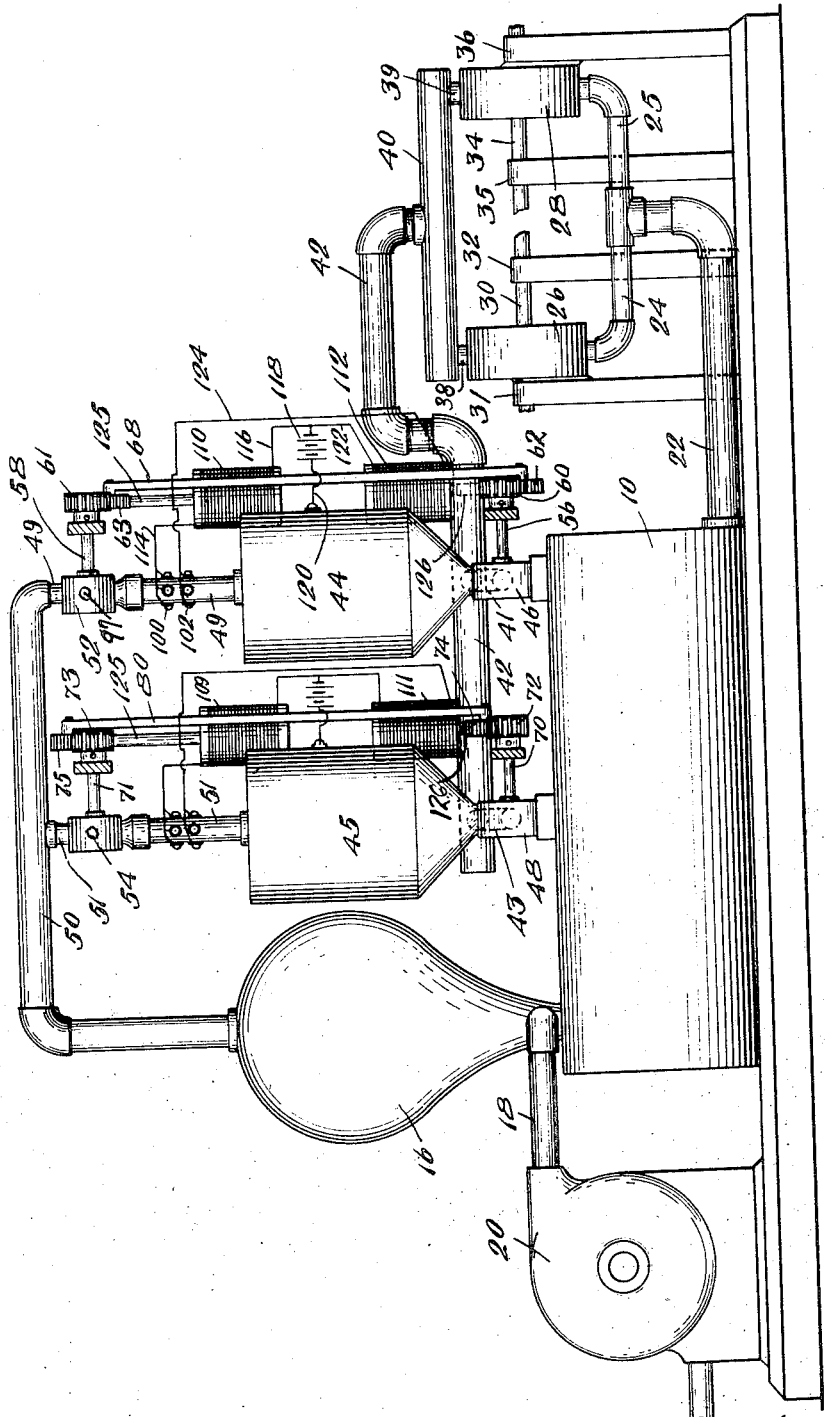

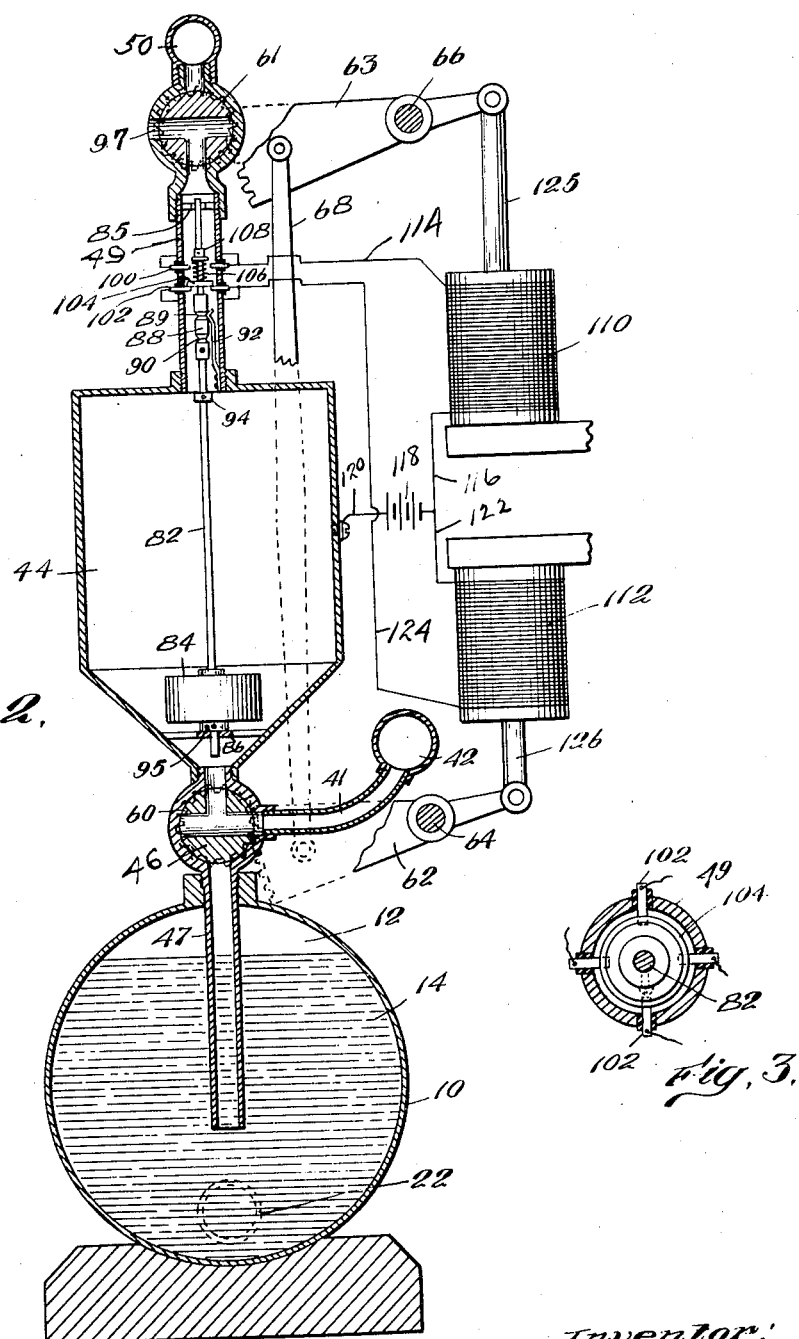

MELVIN L. SEVERY, OF ARLINGTON HEIGHTS, MASSACHUSETTS.

POWER SYSTEM.

1,110,722.  Specification of Letters Patent.  Patented Sept. 15, 1914.

Application filed June 25, 1913. Serial No. 775,678.

*To all whom it may concern:*

Be it known that I, MELVIN L. SEVERY, of Arlington Heights, in the county of Middlesex and State of Massachusetts, have invented certain new and useful Improvements in Power Systems, of which the following is a specification.

This invention relates to an improvement in power systems.

The object of the invention is to provide a system by which energy may be stored through the agency of a relatively light fluid, such as air for example, and this energy utilized through the agency of a relatively heavy fluid, such as water, oil or glycerin.

In the present embodiment of the invention a storage tank is employed containing two fluids of different specific gravities, the power generator acting through the agency of the lighter fluid, and the power consumer or motor acting through the agency of the heavier fluid. With this arrangement I am enabled to use a light, exceedingly mobile fluid for the pressure creator, and a denser, easily handled fluid for the propulsive fluid for the motors. This makes it possible to pack the motors and prevent the great losses attendant upon motors driven by a rare fluid like air.

The invention contemplates the use of any means for creating a pressure in a tank containing two fluids, and utilizing the denser fluid in an engine or motor, said denser fluid being returned to the pressure tank against the pressure thereof to be used repeatedly.

The invention will be readily understood from an inspection of the accompanying drawings, in which—

Figure 1 is a side elevation of a system of apparatus embodying the invention, Fig. 2 is a sectional elevation showing the interior of one of the receivers, and Fig. 3 is a fragmentary horizontal section showing the arrangement of the stationary contact-members.

As illustrated in said drawings the present illustrative embodiment of the invention comprises a pressure tank 10, which is adapted to contain two fluids 12 and 14, of different densities. The former is preferably air, and the latter is any suitable liquid such as water, oil or glycerin. The tank 10 may be provided with a dome or air chamber 16, which is connected by a pipe 18 with any suitable form of pump 20, by which air or other relatively light fluid may be pumped into said chamber. This pump is shown as a rotary pump, but it should be understood that any suitable pump or other means for performing this function may be employed, said means being driven by an engine or motor.

The tank 10 is connected by a pipe 22 with a pipe having two branches 24, 25, which are connected to power consuming means, such as motors 26, 28, respectively. The motor 26 has a shaft 30 journaled in suitable bearings 31, 32, and the motor 28 has a shaft 34 journaled in suitable bearings 35, 36, said shafts being shown separate for convenience in enabling them to be used in place of differential gearing in automobile work, although any number of power consuming devices may be employed. The discharge ports of the motors 26 and 28 are connected by branch pipes 38, 39, to a pipe 40, which is connected to a common return pipe 42, the latter being connected to a pair of receivers 44, 45 in which the liquid is accumulated and periodically returned to the pressure tank 10. The pipe 42 is connected to the bottom of the receivers 44, 45 by branches 41, 43 entering three-way valves 46, 48, which are adapted to be turned so as to shut off communication between said pipe 42 and the bottom of said receivers, and to open communication between said receivers and pipes 47 which communicate with the pressure tank and extend below the surface of the liquid therein. Two receivers 44, 45 are employed so that while one is discharging into the pressure tank 10, the other can be filling from the pipe 42.

The dome or air-chamber 16 is connected to a pipe 50, having branches 49 and 51 connected with the tops of the receivers 44, 45 through three-way valves 52, 54, which are adapted to be turned so as to shut off communication between said pipe and the tops of said receivers, and to open communication between said receivers and the atmosphere. The valves 46 and 52 are provided with stems 56 and 58, having gears 60 and 61, respectively, said gears meshing with sectors 62, 63 mounted on stud shafts 64, 66. The sectors 62, 63 are in the form of levers fulcrumed upon the studs 64, 66, said levers being connected by a pitman 68 so that they will move in unison and operate the valves 46 and 52 simultaneously.

The valves 48 and 54 are provided with stems 70, 71, having gears 72, 73, respectively, said gears meshing with sectors 74, 75 mounted on stud shafts like 64 and 66. The sectors 74, 75 are in the form of levers fulcrumed upon stud shafts, and are connected by a pitman 80 so that they will move in unison and operate the valves 48 and 54 simultaneously.

Each receiver 44, 45 is provided with a rod 82 upon which a float 84 is mounted to slide, said rod being also slidably mounted in guides 85, 86 at its upper and lower ends. The rod 82 is provided with a sleeve 88, which is fast thereon and has two grooves 89 and 90 adapted to receive the bent end of a spring finger 92 secured to the outlet of the tank, said finger operating to hold said rod in its lowermost position until raised by the float 84 coming into engagement with a collar 94 fast on said rod, and said rod is held in its uppermost position by said finger until the float engages a collar 95 on the lower end of said rod, and said finger also acts as an electric contact-member to provide connection between the receiver and the slidable rod 82.

Two stationary sets of contact-members 100, 102 are mounted so as to project into the interior of each of the pipes 49, 51, each set being preferably composed of several contact-members insulated from said pipes. The contact-members of each set are connected to a common conductor, as shown in Fig. 1, to assure a good connection between said stationary contact-members and a co-operating contact-member 104, which is slidably mounted on the rod 82 and engaged by a spring 106 embracing said rod, said spring engaging a collar 108 affixed to said rod.

In order to control the operation of the valves at the top and bottom of the receivers 44, 45, I provide a pair of solenoids 109, 111, and 110, 112 for each tank or receiver. As the operation of both sets of solenoids is the same, only one set need be explained. The coil 110 is connected by a wire 114 to the upper series of contact-members 100, and said coil is connected by a wire 116 to one pole of a battery 118, the other pole of which is connected by a wire 120 to the receiver 44. The coil 112 is connected by a wire 122 to the battery 118, and by a wire 124 to the lower series of stationary contact-members 102. Cores 125 for the coils 110, 109 are pivotally connected to one end of the levers 63 and 75, and cores 126 for the coils 112, 111 are pivotally connected to one end of the levers 62 and 74, so that when said coils are energized said cores are attracted to operate said levers and their sectors, and also the valves controlled thereby.

The operation of the system is as follows: Air or other relatively light fluid is pumped by the pump 20 through the pipe 18 into the tank 10 above the liquid 14, and this liquid is delivered through the pipe 22 to the motors 26 and 28 as required. The liquid is exhausted from the motors into the branches 38, 39 and the pipe 40 to the return pipe 42. The return pipe is in communication with one of the receivers 44, 45 through the valves at the bottom thereof, said valve being then in the position shown in Fig. 2; that is, the valve has been so turned that communication between the pressure tank 10 and the receiver has been closed, and communication between said pipe and said receiver or accumulating tank is open, and the upper valve has established communication between the tank 44 and the atmosphere through the port 97. The exhaust liquid then enters the receiver, and the float 84 rises until it engages the collar 94 fast on the rod 82, and raises said rod to bring the contact-member 104 into engagement with the upper set of stationary contact-members 100. The circuit is now closed through the solenoid 110, which is energized and draws down its core 125. This causes the sectors 62, 63 to be swung up from the position shown, so that the valves 46, 52 are given a quarter-turn counter clockwise. When this movement has taken place the receiver is open to the pressure in the tank 10 at both top and bottom, and the liquid in the receiver falls by gravity into said tank. When the receiver is emptied the float 84 is returned to the position shown in Fig. 2, in engagement with the collar 95 on the rod 82, and the contact-members 104 and 102 are brought into engagement. Thereupon the lower solenoid 112 is energized and draws up its core 126, thus swinging the sectors into the position shown in Fig. 2. The valve 46 is thereby turned to close communication between the receiver and the tank 10, and establish communication between said receiver and the pipes 41, 42; and the valve 52 is turned to shut off communication between the receiver and the pipe 50 and to open communication between said receiver and the atmosphere, so that said receiver may be again filled with the liquid, it being understood that the other receiver may now be emptied in the manner above set forth. Thus a continuous circulation of the liquid through the motors and back to the pressure tank is provided.

What I claim is:—

1. A power system, comprising a receptacle containing two fluids under pressure, said fluids being of different specific gravities, the lighter of said two fluids being employed to store energy and the heavier of said fluids being employed to utilize said energy, and means for supplying said heavier fluid to said receptacle against said pressure.

2. A power system, comprising a generator which creates a pressure of a relatively light fluid in a receiver, and a relatively heavy fluid subjected to said pressure for circulation to utilize the energy from said generator, and means for returning said relatively heavy fluid to said receiver against said pressure.

3. A power system comprising a prime member arranged to create a pressure in a receiver, a secondary member arranged to use a fluid under pressure from said receiver, and means for returning said used fluid to said receiver under said pressure to be repeatedly used.

4. A power system, comprising means containing two fluids of different specific gravities, means for compressing the lighter of said fluids, means for utilizing the heavier of said fluids, and means for returning said heavier fluid to said first-named means against the pressure of said lighter fluid.

5. A power system, comprising a receptacle containing a liquid and a gas in communication, means for compressing said gas into said receptacle, means for utilizing said liquid for propulsion, and means for returning said liquid to said receptacle while under pressure.

6. A power system, comprising a tank containing a liquid and a gas in communication under pressure, means for utilizing the energy of said liquid, a receiver for accumulating said liquid after it has been used, and means whereby said liquid is returned to said tank while the latter is under pressure.

7. A power system, comprising a receptacle containing two fluids of different specific gravities, means for compressing the lighter of said fluids, a plurality of receivers for accumulating the heavier of said fluids, and means for returning said heavier fluid to said receptacle while the latter is under the pressure of said lighter fluid, said receivers being so arranged that while one is discharging another may be charging.

8. A power system, comprising a receptacle containing two fluids of different specific gravities under pressure, a receiver adapted to accumlate said heavier fluid, and means whereby both ends of said receiver may be simultaneously placed in communication with the pressure in said receptacle, whereby said heavier fluid is discharged from said receiver into said receptacle by gravity.

9. A power system, comprising a receptacle containing two fluids of different specific gravities, means for compressing the lighter of said fluids, a receiver adapted to accumulate the heavier fluid, means whereby said heavier fluid is returned to said receptacle while the latter is under the pressure of said lighter fluid, and electro-responsive means for controlling the return of said heavier fluid.

10. A power system, comprising a tank containing a liquid and a gas under pressure, means for compressing said gas into said tank, a receiver for accumulating said liquid, piping connecting both ends of said receiver with said tank, and valves in said piping arranged to place both ends of said receiver simultaneously in communication with the pressure in said tank, whereby said liquid is discharged from said receiver into said tank by gravity.

In testimony whereof I have affixed my signature in the presence of two witnesses.

MELVIN L. SEVERY.

Witnesses:
EDWARD S. CROCKETT,
WILLIAM J. SPERL.